United States Patent
Tang

(10) Patent No.: US 11,991,779 B2
(45) Date of Patent: May 21, 2024

(54) SUBSCRIPTION MESSAGE PROCESSING METHOD AND APPARATUS, AND COMPUTER DEVICE AND STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 420 days.

(21) Appl. No.: 17/338,298

(22) Filed: Jun. 3, 2021

(65) Prior Publication Data

US 2021/0289343 A1    Sep. 16, 2021

Related U.S. Application Data

(63) Continuation of application No. PCT/CN2018/120926, filed on Dec. 13, 2018.

(51) Int. Cl.
*H04W 8/18* (2009.01)
*H04W 8/20* (2009.01)
*H04W 8/28* (2009.01)
*H04W 24/08* (2009.01)

(52) U.S. Cl.
CPC ............ *H04W 8/183* (2013.01); *H04W 8/20* (2013.01); *H04W 8/28* (2013.01); *H04W 24/08* (2013.01)

(58) Field of Classification Search
None
See application file for complete search history.

(56) References Cited

U.S. PATENT DOCUMENTS

| | | |
|---|---|---|
| 2008/0140709 A1 | 6/2008 | Sundstrom |
| 2009/0271859 A1 | 10/2009 | Trossen |
| 2015/0006758 A1 | 1/2015 | Holtman et al. |
| 2016/0219125 A1* | 7/2016 | Xiao ................. H04W 4/70 |

(Continued)

FOREIGN PATENT DOCUMENTS

| | | |
|---|---|---|
| CN | 101316221 A | 12/2008 |
| CN | 101611614 A | 12/2009 |
| CN | 101754486 A | 6/2010 |

(Continued)

OTHER PUBLICATIONS

Extended European Search Report for European Application No. 18943219.8 dated Oct. 28, 2021. 7 pages.

(Continued)

*Primary Examiner* — Hong Shao
(74) *Attorney, Agent, or Firm* — Perkins Coie LLP

(57) ABSTRACT

A method and an apparatus, a computer device and a storage medium for processing subscription message are disclosed. The method comprises: a subscription device first receives a subscription message comprising a sending address of a notification message, and a subscription resource identifier, then monitors a target resource corresponding to the subscription resource identifier in the subscription message, and sends the notification message to an NS device when the target resource changes, so that an RCD corresponding to the NS device forwards the notification message.

10 Claims, 8 Drawing Sheets

(56) References Cited

U.S. PATENT DOCUMENTS

2019/0097962 A1* 3/2019 Young .................. H04L 51/224

FOREIGN PATENT DOCUMENTS

| | | | |
|---|---|---|---|
| CN | 101945375 | A | 1/2011 |
| CN | 102377686 | A | 3/2012 |
| CN | 102664899 | A | 9/2012 |
| CN | 102761581 | A | 10/2012 |
| CN | 103618800 | A | 3/2014 |
| CN | 104283800 | A | 1/2015 |
| CN | 104796417 | A | 7/2015 |
| CN | 105101456 | A | 11/2015 |
| CN | 105208654 | A | 12/2015 |
| CN | 105210126 | A | 12/2015 |
| CN | 105228111 | A | 1/2016 |
| CN | 105282118 | A | 1/2016 |
| CN | 105578381 | A | 5/2016 |
| CN | 105579381 | A | 5/2016 |
| CN | 105580396 | A | 5/2016 |
| CN | 105723788 | A | 6/2016 |
| CN | 105959165 | A | 9/2016 |
| CN | 105960770 | A | 9/2016 |
| CN | 106230896 | A | 12/2016 |
| CN | 106603394 | A | 4/2017 |
| CN | 106714082 | A | 5/2017 |
| CN | 108028861 | A | 5/2018 |
| CN | 108183967 | A | 6/2018 |
| CN | 108353094 | A | 7/2018 |
| JP | 2009104254 | A | 5/2009 |
| JP | 2013205874 | A | 10/2013 |
| JP | 2017504854 | A | 2/2017 |
| KR | 20160039612 | A | 4/2016 |
| KR | 20160082967 | A | 7/2016 |
| WO | 2016171841 | A1 | 10/2016 |
| WO | 2018096641 | A1 | 5/2018 |

OTHER PUBLICATIONS

First Office Action for Chinese Application No. 201880037161.4 dated Oct. 11, 2021. 28 pages with English translation.
Wang, H. et al. "A Lightweight XMPP Publish/Subscribe Scheme for Resource-Constrained IoT Devices" IEEE Access; 2017; vol. 5; pp. 16393-16405.
Examination Report for European Application No. 18943219.8 dated Jan. 31, 2023. 6 pages.
Examination Report for Australian Application No. 2018453104 dated Mar. 15, 2022. 4 pages.
Examination Report for Indian Application No. 202117030308 dated Mar. 8, 2022. 7 pages with English translation.
Notification of Reason for Refusal for Korean Application No. 10-2021-7019779 dated Jan. 27, 2022. 8 pages with English translation.
ETSI "Machine-to-Machine Communications (M2M); Functional architecture" Draft ETSI TS 102 690 V<0.9.1> (Dec. 2010). 210 pages.
Examination Report for European Application No. 18943219.8 dated Jul. 20, 2022. 6 pages.
Kuwae, K. et al. "IoT based Integrated Network System using MQTT" IEEE Japan—The Papers of Jount Technical Meeting on Systems and Smart Facilities, 2018.8 pages.
Notice of Reasons for Refusal for Japanese Application No. 2021-532982 dated Jun. 3, 2022. 7 pages with English translation.
Second Office Action for Chinese Application No. 201880037161.4 dated Apr. 28, 2022. 26 pages with English translation.
Decision to Grant for Japanese Application No. 2021-532982 dated Sep. 27, 2022. 5 pages with English translation.
Notice of Acceptance for Australian Application No. 2018453104 dated Sep. 19, 2022. 3 pages.
Third Office Action for Chinese Application No. 201880037161.4 dated Aug. 3, 2022. 24 pages with English translation.
Written Decision on Registration for Korean Application No. 2021-7019779 dated Jul. 25, 2022. 4 pages with English translation.
International Search Report dated Aug. 27, 2019 of PCT/CN2018/120926 (4 pages).
First Office Action of the Singaporean application No. 11202105928U, dated Aug. 1, 2023. 8 pages.

* cited by examiner

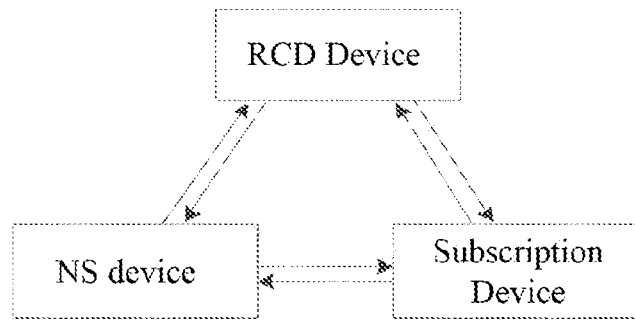

FIG. 1A

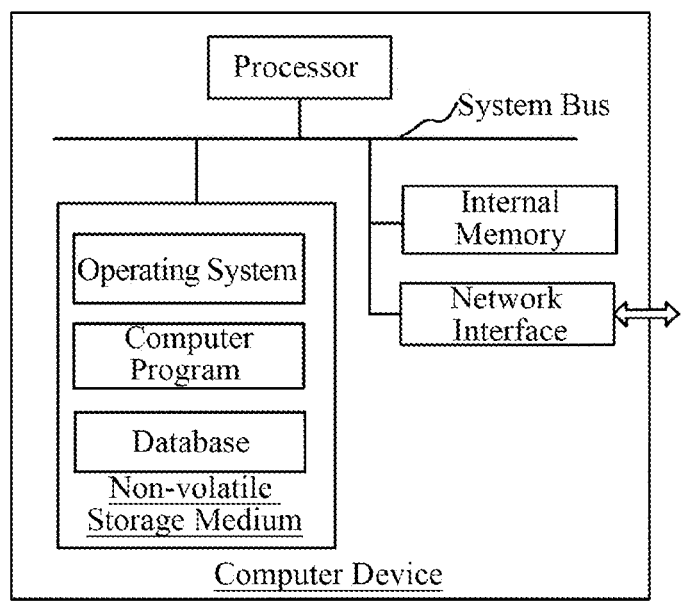

FIG. 1B

A subscription device receives a subscription message, wherein the subscription message includes a sending address of a notification message and a subscription resource identifier — S101

The subscription device monitors a target resource corresponding to the subscription resource identifier — S102

If the subscription device monitors a change of the target resource, the subscription device sends a notification message to a notification server (NS) device, which is a notification proxy, according to the sending address of the notification message, such that the NS device forwards the notification message to a corresponding RCD — S103

FIG.2

A subscription device identifies whether a sending end of a subscription message has an authority of subscribing to a target resource according to a device identifier carried in the subscription message — S201

If the sending end has the authority of subscribing to the target resource, the subscription device stores the subscription message and sends a notification message of subscription completion to the sending end — S202

FIG. 3

An NS device receives a notification message sent by a subscription device, wherein the notification message is used for indicating a transmission change of a target resource subscribed by an RCD — S301

The NS device sends the notification message to a corresponding RCD — S302

FIG. 4

An NS device receives a query message sent by an RCD, wherein the query message includes a device identifier of the RCD — S401

The NS device determines a target resource identifier corresponding to the device identifier of the RCD according to a correspondence between a device identifier of an RCD and a resource identifier — S402

The NS device sends a notification message carrying the target resource identifier to the RCD — S403

FIG. 5

SUBSCRIPTION MESSAGE PROCESSING METHOD AND APPARATUS, AND COMPUTER DEVICE AND STORAGE MEDIUM

CROSS-REFERENCE TO RELATED APPLICATION

The present application is a continuation application of International PCT Application No. PCT/CN2018/120926, filed on Dec. 13, 2018, the entire content of which is hereby incorporated by reference.

TECHNICAL FIELD

The present disclosure relates to the technical field of the Internet of Things, in particular to a method and an apparatus for processing subscription message, a computer device and a storage medium.

BACKGROUND

With the development of Internet of Things and intelligent home technology and industry, intelligent household appliances have entered the lives of ordinary residents, and intelligent household appliance devices can be divided into Normal Devices (ND) and Resource Constrained Devices (RCD). A normal device refers to a device having strong capabilities in processing speed, continuous operation, networking, etc. Compared with the normal device, a resource constrained device has relatively scarce hardware resources, resulting in poor service processing capability and standby capability. The resource constrained device may periodically enter a sleep state (for power saving) in a network, or cannot process a large quantity of service requests in real time.

When the RCD needs to subscribe to contents of other devices, the RCD may send a subscription message to the other devices. After receiving the subscription message, the other devices cache the request message, complete the subscription, monitor a resource subscribed by the RCD, and send a notification message to the RCD when the resource subscribed by the RCD changes.

However, since the RCD may stay in the sleep state for a long time or periodically, or the RCD cannot process a large quantity of service requests in real time, there may be a possibility that the RCD may not receive the notification message in time or may miss the notification message.

SUMMARY

Based on this, it is necessary to provide a method and an apparatus for processing subscription message, a computer device and storage medium, aiming at the technical problem that an RCD may be in a sleep state for a long time or periodically, or cannot process a large quantity of service requests in real time, such that the RCD may not receive notification messages in time or may miss notification messages.

In a first aspect, an implementation of the present disclosure provides a method for processing subscription message, including:

receiving, by a subscription device, a subscription message, wherein the subscription message includes a sending address of a notification message and a subscription resource identifier;

monitoring, by the subscription device, a target resource corresponding to the subscription resource identifier; and sending, by the subscription device, the notification message to a notification server (NS) device, which is a notification proxy, according to the sending address of the notification message if the subscription device monitors a change of the target resource, such that the NS device forwards the notification message to a corresponding RCD.

In an implementation, before monitoring, by the subscription device, the target resource corresponding to the subscription resource identifier, the method further includes:

identifying, by the subscription device, whether a sending end of the subscription message has an authority of subscribing to the target resource according to a device identifier carried in the subscription message; and storing, by the subscription device, the subscription message and sending a notification message of subscription completion to the sending end if the sending end has the authority of subscribing to the target resource.

In an implementation, the sending end is an RCD or an NS device corresponding to the RCD.

In an implementation, after sending, by the subscription device, the notification message to the notification server (NS) device, which is the notification proxy, according to the sending address of the notification message, the method further includes:

receiving, by the subscription device, a notification response message sent by the NS device.

In a second aspect, an implementation of the present disclosure provides a method for processing subscription message, including:

receiving, by an NS device, a notification message sent by a subscription device, wherein the notification message is used for indicating a change of a target resource subscribed by an RCD; and sending, by the NS device, the notification message to a corresponding RCD.

In an implementation, sending, by the NS device, the notification message to the corresponding RCD includes:

receiving, by the NS device, a query message sent by the RCD, wherein the query message includes a device identifier of the RCD;

determining, by the NS device, a target resource identifier corresponding to the device identifier of the RCD according to a correspondence between a device identifier of an RCD and a resource identifier; and sending, by the NS device, the notification message carrying the target resource identifier to the RCD.

In an implementation, receiving, by the NS device, the query message sent by the RCD includes:

receiving, by the NS device, the query message sent by the RCD according to a preset period.

In an implementation, before receiving, by the NS device, the query message sent by the RCD, the method further includes:

broadcasting, by the NS device, a notification message list, wherein the notification message list includes an identification parameter used for the RCD to identify the notification message;

receiving, by the NS device, the query message sent by the RCD includes:

receiving, by the NS device, the query message sent by the RCD after querying the notification message list.

In an implementation, the identification parameter includes a target resource identifier, an device identifier of an RCD, or an identification code of a subscription relation.

In an implementation, before receiving, by the NS device, the notification message sent by the subscription device, the method further includes:

receiving, by the NS device, the subscription message sent by the RCD, wherein the subscription message includes a sending address of the notification message and a subscription resource identifier; and sending, by the NS device, the subscription message to the subscription device.

In an implementation, after sending, by the NS device, the subscription message to the subscription device, the method further includes:

receiving, by the NS device, a notification message of subscription completion sent by the subscription device, wherein the notification message of subscription completion is used for indicating that the NS device has an authority of subscribing to the target resource; and forwarding, by the NS device, the notification message of subscription completion to the corresponding RCD.

In an implementation, the method further includes:

receiving, by the NS device, a resource creation request sent by the RCD, wherein the resource creation request is used for requesting to create a proxy resource on the NS device determined by the RCD;

creating, by the NS device, the proxy resource according to the resource creation request; and sending, by the NS device, a response message to the RCD after the proxy resource is created, wherein the response message includes a sending address of the notification message.

In an implementation, after receiving, by the NS device, the subscription message sent by the subscription device, the method further includes:

sending, by the NS device, a notification response message to the subscription device.

In a third aspect, an implementation of the present disclosure provides a method for processing subscription message, including:

sending, by an RCD, a subscription message, wherein the subscription message includes a sending address of a notification message and a subscription resource identifier; and receiving, by the RCD, a notification message sent by an NS device corresponding to the sending address of the notification message, wherein the notification message is used for indicating a change of a target resource corresponding to the subscription resource identifier.

In an implementation, sending the subscription message includes:

sending, by the RCD, the subscription message to the NS device, such that the NS device forwards the subscription message to a subscription device; or sending, by the RCD, the subscription message to the subscription device.

In an implementation, before receiving, by the RCD, the notification message sent by the NS device corresponding to the sending address of the notification message, the method further includes:

sending, by the RCD, a query message to the NS device, wherein the query message includes a device identifier of the RCD;

receiving, by the RCD, the notification message sent by the NS device corresponding to the sending address of the notification message includes:

receiving, by the RCD, the notification message sent by the NS device according to the query message.

In an implementation, sending, by the RCD, the query message to the NS device includes:

sending, by the RCD, the query message to the NS device according to a preset period; or querying, by the RCD, a notification message list broadcast by the NS device, and sending the query message to the NS device if the notification message list indicates a notification message needed by the RCD, wherein the notification message list includes an identification parameter used for the RCD to identify the notification message.

In an implementation, the identification parameter includes a target resource identifier, a device identifier of an RCD, or an identification code of a subscription relation.

In an implementation, before receiving, by the RCD, the notification message sent by the NS device corresponding to the sending address of the notification message, the method further includes:

receiving, by the RCD, a notification message of subscription completion, wherein the notification message of subscription completion is used for indicating that the RCD or the NS device corresponding to the RCD has an authority of subscribing to the target resource.

In an implementation, the method further includes:

sending, by the RCD, a resource creation request to an NS device, wherein the resource creation request is used for requesting to create a proxy resource on the NS device determined by the RCD; and receiving, by the RCD, a first response message sent by the NS device, wherein the first response message includes the sending address of the notification message.

In an implementation, the method further includes:

sending, by the RCD, a broadcast message, wherein the broadcast message includes a proxy resource type identifier;

receiving, by the RCD, second response messages sent by a plurality of NS devices according to the broadcast message; and determining, by the RCD, a target NS device from the plurality of NS devices according to the second response messages.

In an implementation, determining, by the RCD, the target NS device from the plurality of NS devices according to the second response messages includes:

determining, by the RCD, an NS device with a highest priority as the target NS device according to a priority of the NS device carried in each of the second response messages.

In a fourth aspect, an implementation of the present disclosure provides an apparatus for processing subscription message, including:

a first receiving module, configured to receive a subscription message, wherein the subscription message includes a sending address of a notification message and a subscription resource identifier;

a monitoring module, configured to monitor a target resource corresponding to the subscription resource identifier; and a first sending module, configured to send the notification message to a notification server (NS) device, which is a notification proxy, according to the sending address of the notification message if the subscription device monitors a change of the target resource, such that the NS device forwards the notification message to a corresponding RCD.

In a fifth aspect, an implementation of the present disclosure provides an apparatus for processing subscription message, including:

a second receiving module, configured to receive a notification message sent by a subscription device, wherein the notification message is used for indicating a change of a target resource subscribed by an RCD; and a second sending module, configured to send the notification message to a corresponding RCD.

In a sixth aspect, an implementation of the present disclosure provides an apparatus for processing subscription message, including:

a third sending module, configured to send a subscription message, wherein the subscription message includes a sending address of a notification message and a subscription resource identifier; and a third receiving module, configured to receive a notification message sent by an NS device corresponding to the sending address of the notification message, wherein the notification message is used for indicating a change of a target resource corresponding to the subscription resource identifier.

In a seventh aspect, an implementation of the present disclosure provides a computer device including a memory and a processor, wherein a computer program is stored in the memory, and when executing the computer program, the processor implements the following acts:

receiving, by a subscription device, a subscription message, wherein the subscription message includes a sending address of a notification message and a subscription resource identifier; monitoring, by the subscription device, a target resource corresponding to the subscription resource identifier; and sending, by the subscription device, a notification message to a notification server (NS) device, which is a notification proxy, according to the sending address of the notification message if the subscription device monitors a change of the target resource, such that the NS device forwards the notification message to a corresponding RCD;

or, receiving, by an NS device, a notification message sent by a subscription device, wherein the notification message is used for indicating a change of a target resource subscribed by an RCD; and sending, by the NS device, the notification message to a corresponding RCD;

or, sending, by an RCD, a subscription message, wherein the subscription message includes a sending address of a notification message and a subscription resource identifier; and receiving, by the RCD, a notification message sent by an NS device corresponding to the sending address of the notification message, wherein the notification message is used for indicating a change of the target resource corresponding to the subscription resource identifier.

In an eighth aspect, an implementation of the present disclosure provides a computer readable storage medium on which a computer program is stored, wherein when executed by a processor, the computer program implements the following acts:

receiving, by a subscription device, a subscription message, wherein the subscription message includes a sending address of a notification message and a subscription resource identifier; monitoring, by the subscription device, a target resource corresponding to the subscription resource identifier; and sending, by the subscription device, a notification message to a notification server (NS) device, which is a notification proxy, according to the sending address of the notification message if the subscription device monitors a change of the target resource, such that the NS device forwards the notification message to a corresponding RCD;

or, receiving, by an NS device, a notification message sent by a subscription device, wherein the notification message is used for indicating a hange of a target resource subscribed by an RCD; and sending, by the NS device, the notification message to a corresponding RCD;

or, sending, by an RCD, a subscription message, wherein the subscription message includes a sending address of a notification message and a subscription resource identifier; and receiving, by the RCD, a notification message sent by an NS device corresponding to the sending address of the notification message, wherein the notification message is used for indicating a change of the target resource corresponding to the subscription resource identifier.

According to the method and apparatus for processing subscription message, the computer device and the storage medium provided by the implementations of the present disclosure, the subscription device first receives the subscription message including the sending address of the notification message and the subscription resource identifier, then monitors the target resource corresponding to the subscription resource identifier in the subscription message, and sends the notification message to the NS device when the target resource changes, such that the NS device forwards the notification message to the corresponding RCD. When the RCD is in a sleep state for a long time or periodically, or cannot process a large quantity of service requests in real time, the subscription device can forward the message needed by the RCD through the NS device, such that the RCD can receive messages in time without missing any message, which greatly improves the success rate of message acquisition of the RCD.

BRIEF DESCRIPTION OF DRAWINGS

FIG. 1A is a diagram of an application environment of a method for processing subscription message according to an implementation.

FIG. 1B is a schematic diagram of an internal structure of a server according to an implementation.

FIG. 2 is a schematic flowchart of a method for processing subscription message according to an implementation.

FIG. 3 is a schematic flowchart of a method for processing subscription message according to an implementation.

FIG. 4 is a schematic flowchart of a method for processing subscription message according to an implementation.

FIG. 5 is a schematic flowchart of a method for processing subscription message according to an implementation.

DETAILED DESCRIPTION

In order to make objects, technical solutions, and advantages of the present disclosure more clear and understandable, the present disclosure will be described in further detail below with reference to drawings and implementations. It should be understood that implementations described herein are only intended to explain the present disclosure but are not intended to limit the present disclosure.

A method for processing subscription message provided in the present disclosure is may be applied in to an application environment as shown in FIG. 1, including a Resource Constrained Device (RCD), a Notification Sever (NS) and a subscription device, wherein the RCD, the NS device and the subscription device may communicate with each other, and the communication mode may be a wireless communication, such as WIFi, infrared communication or 3G, 4G, 5G, which is not limited in this implementation. In the above, the RCD may be an intelligent household appliance with limited resources, such as a lamp, an air conditioner, or the RCD may also be an intelligent terminal, such as a mobile phone or a PAD. The NS device may be a device which has the same type of the RCD, but is a resource unconstrained device, and the NS device may also be a server, etc. The specific type of an NS device is not limited in an implementation of the present disclosure. In the above, the subscription device may be a server or other processing device, which is not limited in this implementation. As shown in FIG. 1B, the server may include a processor, a memory, a network interface and a database which are connected via a system bus. In the above, the processor of the server is configured to provide computing and control capabilities. The memory of the server includes a non-volatile storage medium and an internal memory. An operating system, a computer program and a database may be stored in the non-volatile storage medium. The internal memory provides an environment for operation of the operating system and a computer program in the non-volatile storage medium. The database of the server is configured to store data of the method for processing subscription message. The network interface of the server is configured to communicate with other external devices through a network connection. The computer program, when executed by a processor, implements a method for processing subscription message.

Figure 7:
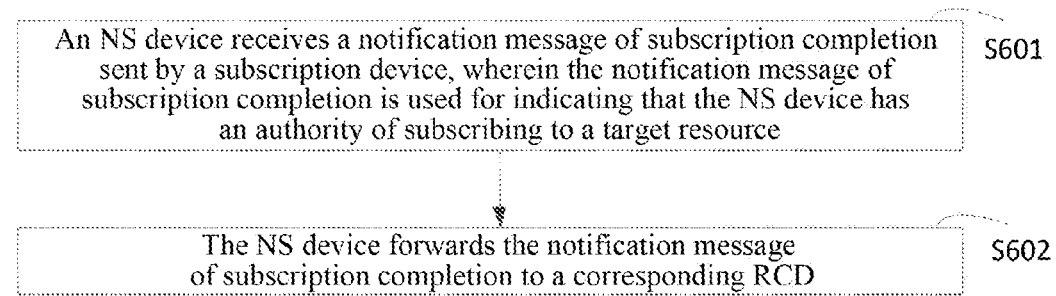
FIG. 7 is a schematic flowchart of a method for processing subscription message according to an implementation.
Figure 8:
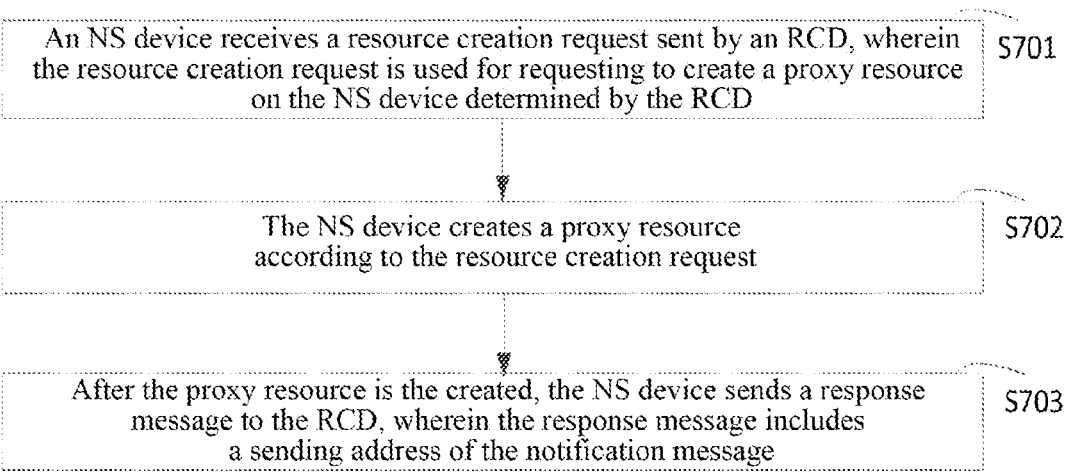
FIG. 8 is a schematic flowchart of a method for processing subscription message according to an implementation.
Figure 9:
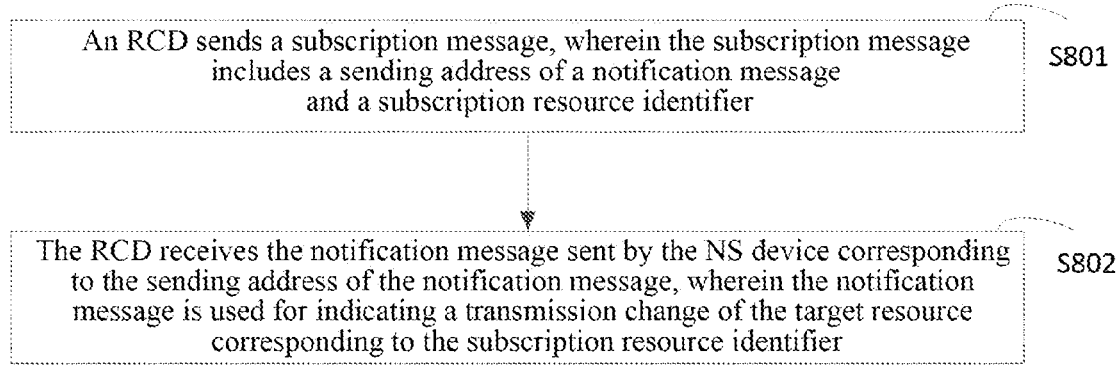
FIG. 9 is a schematic flowchart of a method for processing subscription message according to an implementation.
Figure 10:
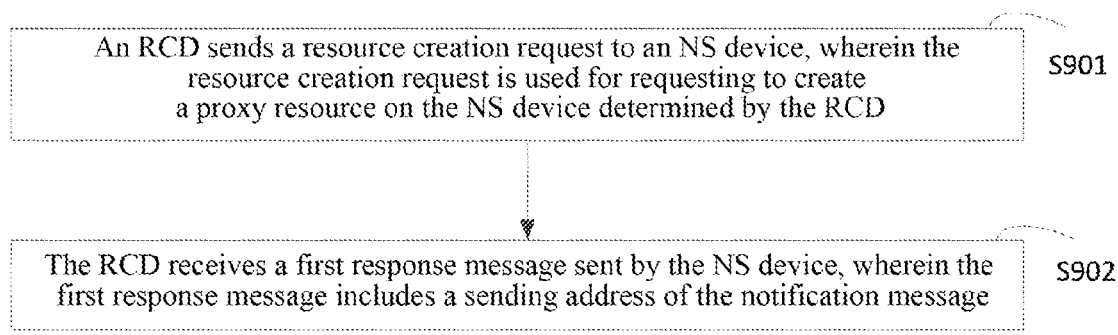
FIG. 10 is a schematic flowchart of a method for processing subscription message according to an implementation.

An implementation of the present disclosure provides a method and an apparatus for processing subscription message, a computer device, and a storage medium, aiming at solving the technical problem that the RCD may be in a sleep state for a long time or periodically or cannot process a large quantity of service requests in real time such that the RCD may not receive notification messages in time or may miss notification messages. Technical solutions of the present disclosure and how the above technical problem is solved through the technical solutions of the present disclosure will be described in detail through implementations with reference to drawings. The following specific implementations may be combined with each other, and same or similar concepts or processes may not be repeated in some implementations. It should be noted that a method for processing subscription message provided by the implementations of the present disclosure will be described with different executors, in which the executors in FIG. 2 and FIG. 3 are subscription devices, the executors in FIGS. 4-8 are NS devices, and the executors in FIGS. 9-11 are RCDs. In the above, the executor of each implementation may also be an apparatus for processing subscription message, wherein the apparatus can realize part or all of resource updating by software, hardware or a combination of software and hardware.

In order to make the purpose, technical solutions and advantages of implementations of the present disclosure more clear, the technical solutions in the implementations of the present disclosure will be described clearly and completely in the following with reference to the drawings in the implementations of the present disclosure. It is apparent that the described implementations are parts, but not all of the implementations of the present disclosure. All other implementations obtained by those skilled in the art based on the implementations of the present disclosure without paying inventive effort are within the protection scope of the present disclosure.

Implementations in which the executor is a subscription device will be described below.

In an implementation, FIG. 2 provides a method for processing subscription message, and this implementation relates to a specific process in which a subscription device sends a notification message to a corresponding RCD through an NS device. As shown in FIG. 2, the method includes acts S101, S102, and S103.

In S101, a subscription device receives a subscription message, wherein the subscription message includes a sending address of a notification message and a subscription resource identifier.

In the above, the subscription message is used for the RCD to subscribe to a required resource from other device, the subscription message may include the sending address of the notification message and the subscription resource identifier, and may also include a device identifier of a sending end of the subscription message, an identifier of a receiving end of the subscription message, and an operation type of the subscription message, etc. In the above, the address of the notification message indicates the address of a notification message fed back by the subscription device to the resource device when the resource subscribed by the RCD changes, and the subscription resource identifier is an identity of the resource needed to be subscribed, and the identifier is used for distinguishing the resource from other resources. In practical application, the subscription device receives the subscription message including the sending address of the notification message and the subscription resource identifier, wherein the subscription device may receive the subscription message sent by the RCD or receive a subscription message sent by an NS device. In the above, the subscription device may receive the subscription message through wireless communication, such as WIFi, infrared communication or 3G, 4G, 5G, which is not limited in this implementation.

In S102, the subscription device monitors a target resource corresponding to the subscription resource identifier.

Based on the subscription message received in the above act S101, the subscription device monitors the target resource corresponding to the subscription resource identifier in the subscription message, wherein monitoring the target resource by the subscription device may be to monitor a status of the target resource, such as working status, use status, which is not limited in this implementation. It should be noted that in an implementation of the present disclosure, each resource corresponds to a resource identifier, that is, a resource corresponding to the subscription resource identifier carried in the subscription message is the target resource. In the above, the subscription device may also establish a maintenance relationship table between the sending end of the subscription message, the subscribed target resource, and the notification message address, which is used for the subscription device to send a notification message correctly when it sends the notification message subsequently.

In S103, if the subscription device monitors a change of the target resource, the subscription device sends a notification message to a notification server (NS) device, which is a notification proxy, according to the sending address of the notification message, such that the NS device forwards the notification message to a corresponding RCD.

In the above, the notification message is used for indicating that the resource subscribed by the RCD has changed, and the NS device is a selected notification proxy to help the RCD receive the notification message when the RCD is in a sleep state or other inoperable state. In the above, the RCD is a device with poor service processing capability and standby capability due to the relative shortage of hardware resources. The RCD may periodically enter a sleep state (for power saving) in a network, or cannot handle a large quantity of service requests in real time.

In this act, when the target resource monitored by the subscription device changes, for example, the working state of the target resource changes, the subscription device sends a notification message to the NS device to inform that the working state of the target resource has changed, and the sending address is the sending address of the notification message carried in the subscription message. Upon receiving the notification message, the NS device forwards the notification message to the corresponding RCD. For example, the notification message sent by the subscription device includes: from: 3rd device; to: RCD; op: notify; payload: {resource}. In the above, the manner in which the subscription device sends the notification message to the NS device and the manner in which the NS device forwards the notification message to the RCD may both be transmission through wireless communication, such as WIFi, infrared communication or 3G, 4G, 5G, which is not limited in this implementation.

According to the method for processing subscription message provided by this implementation, the subscription device first receives the subscription message including the sending address of the notification message and the subscription resource identifier, then monitors the target resource corresponding to the subscription resource identifier in the subscription message, and sends the notification message to the NS device when the target resource changes, such that the NS device forwards the notification message to the corresponding RCD. When the RCD is in the sleep state for a long time or periodically, or cannot process a large quantity of service requests in real time, the subscription device can send the message needed by the RCD to the NS device, and the NS device can forward the notification message to the RCD when the RCD is in a working state, such that the RCD can receive messages in time without missing any message, which greatly improves the success rate of message acquisition of the RCD.

Because in some scenarios, in order to ensure that the resources in the subscription devices are subscribed by safe and reliable devices, an authority of each sending end of subscription message may be identified. Therefore, an implementation of the present disclosure provides a method for processing subscription message, and the this implementation relates to a specific process in which a subscription device identifies, according to a device identifier of a sending end of the subscription message carried in the subscription message, an authority of subscribing to a target resources by the sending end of the subscription message. As shown in FIG. 3, the method further includes acts S201 and S202.

In S201, a subscription device identifies whether a sending end of a subscription message has an authority of subscribing to a target resource according to a device identifier carried in the subscription message.

In this implementation, the subscription device identifies whether the sending end of the subscription message has the authority of subscribing to the target resource according to the device identifier carried in the subscription message, wherein the manner in which the subscription device identifies the authority of the sending end of the subscription message may be to check whether a mapping relation between the target resource and the device identifier of the subscription message sending end is stored. If the mapping relation exists, it indicates that the sending end has the authority of subscribing to the target resource, and if the mapping relation does not exist, it indicates that the sending end does not have the authority of subscribing to the target resource. It should be noted that before applying the method for processing subscription message provided by an implementation of the present disclosure, the mapping relation between the target resource and the device identifier of the subscription message sending end needs to be stored in advance in a database of the subscription device, which indicates that the sending end of the subscription message has the authority of subscribing to the target resource.

In S202, if the sending end has the authority of subscribing to the target resource, the subscription device stores the subscription message and sends a notification message of subscription completion to the sending end.

Based on the identification of the authority of the sending end of the subscription message in the above act S201, if the subscription device determines that the sending end has the authority of subscribing to the target resource, the subscription device stores the subscription message sent by the sending end and sends the notification message of subscription completion to the sending end to inform the sending end of a success of the resource subscription. In the above, the subscription device may send the notification message to the sending end through wireless communication, such as WIFi, infrared communication or 3G, 4G and 5G, which is not limited in this implementation.

Optionally, the sending end may be an RCD or an NS device corresponding to the RCD. Specifically, when the RCD needs to subscribe to a resource from the subscription device, the RCD may send a subscription message directly to the subscription device, or it may send a subscription message to the NS device, and then the NS device sends the subscription message to the subscription device.

In practical application, when the sending end is an RCD, the subscription device first identifies whether the RCD has the authority of subscribing to the target resource according to the identifier of the RCD carried in the subscription message, stores the subscription message sent by the RCD when it is determined that the RCD has the authority, and sends a notification message of subscription completion to the RCD. Similarly, when the sending end is an NS device, the subscription device first identifies whether the NS device has the authority of subscribing to the target resource according to the identifier of the NS device carried in the subscription message, stores the subscription message sent by the NS device when it is determined that the NS device has the authority, and sends a notification message of subscription completion to the NS device. It can be understood here that the NS device is a proxy of the RCD. After the subscription succeeds, the subsequent NS device will receive the notification message sent by the subscription device and forward the same to the corresponding RCD.

According to the method for processing subscription message provided by this implementation, the subscription device first identifies whether the sending end of the subscription message has the authority of subscribing to the target resource according to the device identifier carried in the subscription message, stores the subscription message sent by the sending end when it is determined that the sending end has the authority, and sends the notification message of subscription completion to the sending end. In this way, the subsequent acts will be performed only when the sending end has the authority of subscribing to the target resource, which avoids a case that a sending end without access authority subscribes to the target resource, thereby improving the safety and reliability of resource information, and avoiding the waste of resources and time of the subscription device.

Considering that the subscription device needs to know whether the NS device has successfully received the notification message after sending the notification message to the NS device according to the sending address of the notification message in the subscription message, in an implementation, the method further includes: the subscription device receives a notification response message sent by the NS device. Specifically, the subscription device receives the notification response message sent by the NS device after sending the notification message to the NS device according to the sending address of the notification message, in this way, if the subscription device receives the notification response message sent by the NS device, it indicates that the notification message sent by the subscription device is successfully sent, which greatly improves the success rate of message sending by the subscription device.

Implementations in which the executor is an NS device will be described below. It should be noted that some of the contents involved in the following implementations are already described in the above implementations in which the executor is the subscription device, and the repeated contents will not be described again.

In an implementation, FIG. 4 provides a method for processing subscription message, this implementation relates to a specific process in which an NS device receives a notification message sent by a subscription device and forwards the notification message to an RCD. As shown in FIG. 4, the method includes acts S301 and S302.

In S301, an NS device receives a notification message sent by a subscription device, wherein the notification message is used for indicating a change of a target resource subscribed by an RCD.

Specifically, the NS device receives the notification message sent by the subscription device, wherein the notification message is used for indicating that the target resource subscribed by the RCD has changed. For example, if the subscription device monitors that the working state of the target resource subscribed by RCD has changed, it will send the notification message to the NS device. For the specific format and sending mode of the notification message, reference may be made to the description in FIG. 2, which will not be repeated here.

S302, the NS device sends the notification message to a corresponding RCD.

Based on the above act S301, the NS device receives the notification message sent by the subscription device and sends the notification message to the corresponding RCD, wherein sending the notification message to the corresponding RCD by the NS device may be that the NS device sends the notification message to the RCD actively or that the NS device sends the corresponding notification message to the RCD after receiving the acquisition message sent by the RCD.

According to the method for processing subscription message provided by this implementation, the NS device first receives the notification message sent by the subscription device that the target resource subscribed by the RCD has changed, and then forwards the notification message to the RCD, such that when the RCD is in the sleep state for a long time or periodically, or the RCD cannot process a large quantity of service requests in real time, the subscription device can forward the message needed by the RCD through the NS device, such that the RCD can receive messages in time without missing any message, which greatly improves the success rate of message acquisition of the RCD.

Optionally, after the NS device receives the notification message sent by the subscription device, the method further includes: the NS device sends a notification response message to the subscription device. In this implementation, the NS device sends the notification response message to the subscription device, such that the subscription device can determine that the notification message is sent successfully, and then subsequent notification messages can be sent to the NS device normally, thereby ensuring the success rate of message acquisition of the RCD and improving the communication quality.

On the basis of the above implementations, this implementation provides a method for processing subscription message, this implementation relates to a specific process in which the NS device sends a notification message to a corresponding RCD according to a query message sent by the RCD. As shown in FIG. 5, the above act S302 includes S401, S402, and S403.

In S401, the NS device receives a query message sent by the RCD, wherein the query message includes a device identifier of the RCD.

In the above, the NS device receives the query message sent by the RCD, wherein the query message indicates that the RCD queries whether the NS device has a notification message needed by the RCD, and the query message includes the device identifier of the RCD, which represents an identity of the RCD, and the identifier may be a number, a letter or a combination of a number and a letter. In this implementation, the identifier of the RCD is not limited. Optionally, the RCD may send a query message to the NS device periodically, or send a query message to the NS device after the RCD exits the sleep mode, or the RCD may send a query message to the NS device after knowing that the NS device has a notification message needed by the RCD itself.

In S402, the NS device determines a target resource identifier corresponding to the device identifier of the RCD according to a correspondence between a device identifier of an RCD and a resource identifier.

Based on the above act S401, the NS device receives the query message sent by the RCD, and the NS device determines the target resource identifier corresponding to the device identifier of the RCD according to the correspondence between a device identifier of an RCD and a resource identifier. It should be noted that a one-to-one correspondence is established between a device identifier of each RCD and a target resource needed by the RCD, which is stored in the NS device. The NS device searches for the resource corresponding to the device identifier of the RCD in all the stored correspondences, and determines the resource as the target resource needed by the device identifier of the RCD.

In S403, the NS device sends a notification message carrying the target resource identifier to the RCD.

In this act, the NS device determines a notification message carrying the target resource based on the target resource needed by the device identifier of the RCD determined in the above S402, and then sends the notification message to the RCD.

According to the method for processing subscription message provided by this implementation, the NS device receives the query message sent by the RCD, determines the target resource identifier according to the identifier of the RCD in the query message, and sends the notification message carrying the target resource identifier to the RCD. Therefore, after receiving the query message sent by the RCD, the target resource is located according to the correspondence between a device identifier of an RCD and a resource identifier, and then an accurate notification message is located according to the target resource, thus greatly ensuring the accuracy of the notification message sent by the NS device to the RCD.

In the above act S401, "the NS device receives the query message sent by the RCD" includes implementable modes, one of which includes: the NS device receives the query message sent by the RCD according to a preset period. The RCD may periodically send query messages to the NS device, and the preset period may be user-defined, which is not limited in this implementation. For example, the RCD sends a query message to the NS device every 10 minutes, or in a specific state, the RCD sends the query message to the NS device. In this way, in a normal working state, the RCD actively sends query messages to the NS device, thus ensuring that messages can be received in time without missing any message, which greatly improves the success rate of message acquisition of the RCD.

In another implementable mode, if the NS device broadcasts a notification message list before the NS device receives the query message sent by the RCD, wherein the notification message list includes an identification parameter used for the RCD to identify the notification message, then "the NS device receives the query message sent by the RCD" includes: the NS device receives the query message which is sent by the RCD after it queries the notification message list. Optionally, the identification parameter includes: a target resource identifier, a device identifier of an RCD, or an identification code of subscription relation.

In the above, the identification parameter used by the RCD for identifying the notification message indicates the parameter used for the RCD to identify, when the RCD receives the notification message list sent by the NS device, whether a notification message in the notification message list is the notification message for the resource needed by the RCD. The identification parameter may include a target resource identifier, a device identifier of an RCD, or an identification code of subscription relation, wherein the target resource identifier and the device identifier of the RCD are already explained in the above implementations, which will not be repeated here in this implementation. The identification code of subscription relation represents an identification code of the correspondence between the RCD device and the target resource to which it subscribes, wherein the identification code may be a number, a letter or a combination of a number and a letter, which is not limited in this implementation. The NS device broadcasts the notification message list, which means that the NS device broadcasts all the notification messages such that all RCDs can see the messages in the list. When the RCD sees that the notification message list broadcast by the NS device includes the notification message needed by the RCD itself, it sends to the NS device a query message containing the subscription resource identifier and/or the identifier of the RCD. In this way, after receiving the query message, the NS device sends a correct notification message to a correct RCD according to a notification message identifier and/or the identifier of the RCD, which greatly ensures the correctness of messages acquired by the RCD.

It should be noted that after the RCD acquires the notification message from the NS device, the NS device will delete the notification message at the same time, but will keep a notification address of the resource in the created notification message.

Figure 6:
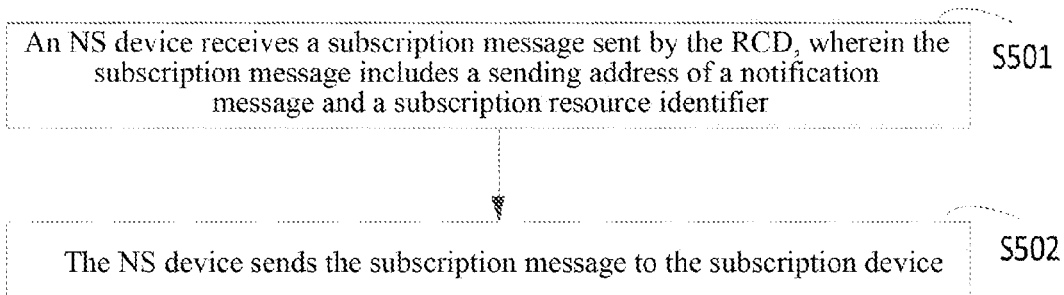
FIG. 6 is a schematic flowchart of a method for processing subscription message according to an implementation.

In some scenarios, the NS device needs to forward the request message from the RCD to the subscription device. In an implementation, the implementation of the present disclosure provides a method for processing subscription message, which relates to a specific process in which the NS device sends the received subscription message sent by the RCD to the subscription device. As shown in FIG. 6, the method further includes S501 and S502.

In S501, an NS device receives a subscription message sent by the RCD, wherein the subscription message includes a sending address of a notification message and a subscription resource identifier.

In this implementation, the NS device receives the subscription message sent by the RCD, wherein the subscription message indicates that the RCD needs a notification of a change of the state of a predetermined target resource. In the above, the subscription message includes a sending address of the notification message and a subscription resource identifier. In the above, the subscription resource identifier is the same as the resource identifier described in the above implementation, which is used for distinguishing between resources, wherein the identifier may be a number, a letter or a combination of a number and a letter.

In S502, the NS device sends the subscription message to the subscription device. Based on the above act S501, the NS device receives the subscription message sent by the RCD, and the NS device sends the subscription message to the subscription device, such that the subscription device can send to the NS device corresponding to the RCD, the correct notification message generated when the subscription resource changes, according to the sending address of the notification message and subscription resource identifier in the subscription message.

According to the method for processing subscription message provided by this implementation, the NS device receives the subscription message sent by the RCD and sends the subscription message to the subscription device according to the sending address of the notification message and subscription resource identifier contained in the subscription resource, such that the subscription device can send the notification message to the correct address when the correct subscription resource changes, according to the sending address of the notification message and subscription resource identifier, such that the RCD can receive messages in time without missing any message, which greatly improves the success rate of message acquisition of the RCD.

After the NS device sends the subscription message to the subscription device, the RCD needs to know whether the subscription message has been successfully received by the subscription device. In an implementation, the implementation of the present disclosure provides a method for processing the subscription message. This implementation relates to a specific process in which the NS device forwards the notification message of subscription completion to the RCD after receiving a notification message of subscription completion sent by the subscription device. As shown in FIG. 7, the method further includes S601 and S602.

In S601, an NS device receives a notification message of subscription completion sent by a subscription device, wherein the notification message of subscription completion is used for indicating that the NS device has an authority of subscribing to a target resource.

In this implementation, the NS device receives the notification message of subscription completion sent by the subscription device, wherein the notification message of subscription completion indicates that the NS device has the authority of subscribing to the target resource, that is, if the NS device receives the notification message of subscription completion sent by the subscription device, the NS device has the authority of subscribing to the target resource and the subscription is successful.

In S602, the NS device forwards the notification message of subscription completion to a corresponding RCD.

Based on the above act S601, the NS device receives the notification message of subscription completion sent by the subscription device and forwards the notification message of subscription completion to the corresponding RCD, such that the RCD can determine that the subscription is successful.

According to the method for processing subscription message provided in this implementation, the NS device receives the notification message of subscription completion sent by the subscription device and forwards the notification message of subscription completion to the corresponding RCD, in this way, it can be ensured that the RCD determines that the subscription message has been successfully received by the subscription device, and that the RCD device knows that the subscription is successful and will not send the subscription message repeatedly or subscribe to resources from other devices.

In an implementation of the present disclosure, since the RCD may be in a state in which a message cannot be received normally, it is necessary to select an NS device to help the RCD to receive notification messages, that is, it is necessary to find a device with resources needed by the RCD to act as a proxy device. In an implementation, the implementation of the present disclosure provides a method for processing subscription message. This implementation relates to a specific process in which the RCD creates a proxy resource to the NS device, as shown in FIG. 8, the method further includes S701, S702, and S703.

In S701, an NS device receives a resource creation request sent by an RCD, wherein the resource creation request is used for requesting to create a proxy resource on the NS device determined by the RCD.

In this implementation, the proxy resource created here represents a type of resource needed by the RCD. The NS device receives the resource creation request sent by the RCD, wherein the resource creation request is used for requesting to create a proxy resource on the NS device determined by the RCD. That is, when the NS device receives the resource creation request sent by the RCD, it means that the RCD has selected the NS device as a proxy device and requests the NS device to create the proxy resource. In the above, the resource creation request may include a device identifier of the RCD and a target resource identifier, or may also include an identification code of subscription relation, wherein the identification code of subscription relation is used for identifying the correspondence between the RCD device and the subscribed target resource. For example, the resource creation request sent by the RCD may include: from: RCD device ID (message sending end); to: notification server device ID+ notification-server (resource id) (requested resource id); op:Create (operation type); rt:notification (created resource type).

In S702, the NS device creates a proxy resource according to the resource creation request. Based on the above act S701, the NS device receives the resource creation request sent by the RCD, and the NS device creates the proxy resource according to the resource creation request, wherein a manner in which the NS device creates a proxy resource may be to save the device identifier of the RCD, the device identifier of NS and the target resource identifier, and establish a type of a resource which may be a proxy. Further, the NS device may also establish a relationship table between the device identifier of the RCD, a sending address of the notification message and the target resource identifier, which is used for the RCD to correctly receive notification messages according to resource identifiers subsequently.

In S703, after the proxy resource is created, the NS device sends a response message to the RCD, wherein the response message includes a sending address of the notification message.

Based on the above act S702, after the NS device creates the proxy resource, the NS device sends the response message to the RCD, the response message indicates that the NS device has successfully created the resource, wherein the response message includes the sending address of the notification message, such that the RCD can correctly receive subsequent notification messages according to the address.

According to the method for processing subscription message provided by this implementation, the NS device creates the proxy resource according to the resource creation request sent by the RCD, and establishes the relationship table between the RCD, the sending address of the notification message, and the resource identifier, and then feeds back a response message to RCD. In this way, the RCD can correctly receive subsequent notification messages according to the relationship table between the RCD, the notification message sending address, and resource identifier, and the notification message address carried in the response message after receiving the response message, thereby greatly ensuring the accuracy of messages acquired by the RCD.

Implementations in which the executor is an RCD will be described below. Similarly, some contents related to the following implementations are already described in the above implementations in which the executor is the subscription device and the above implementations in which the executor is the NS device, and the repeated contents will not be described in detail.

In an implementation, FIG. 9 provides a method for processing subscription message, this implementation relates to a specific process in which the RCD sends a subscription message and receives a notification message sent by an NS device corresponding to a sending address of the notification message included in the subscription message. As shown in FIG. 9, the method includes S801 and S802.

In S801, an RCD sends a subscription message, wherein the subscription message includes a sending address of a notification message and a subscription resource identifier.

In this implementation, the RCD sends a subscription message, which may be sent to the NS device or a subscription device. The subscription message is used for intending to receive a notification message generated when the target resource changes, wherein the sent subscription message includes the sending address of the notification message and the subscription resource identifier.

In S802, the RCD receives the notification message sent by the NS device corresponding to the sending address of the notification message, wherein the notification message is used for indicating a change of the target resource corresponding to the subscription resource identifier.

Based on the subscription message sent by the RCD in act S801, the RCD receives the notification message sent by the NS device, wherein the notification message represents a notification message sent by the subscription device after the resource subscribed by the RCD changes. It should be noted that no matter whether the RCD sends the subscription message to the NS device or to the subscription device, when the notification message is sent, the subscription device always sends the notification message first to the NS device, and then the NS device sends the notification message to the RCD.

According to the method for processing subscription message provided by this implementation, after the RCD first sends the subscription message (which is to be forwarded by the NS device to subscription device) to NS device or the subscription device, the subscription device will send a notification message to the NS device after the resource subscribed by the RCD has changed, and then the RCD receives the notification message sent by the NS device. In this way, through intermediate forwarding by the NS devices, it is ensured that the RCD can receive messages in time without missing any message, which greatly improves the success rate of message acquisition of the RCD.

On the basis of the above implementations, sending of the subscription message by the RCD includes: the RCD sends the subscription message to the NS device, such that the NS device forwards the subscription message to the subscription device; or, the RCD sends the subscription message to the subscription device. In the above, the RCD sends a subscription message, which can be sent by the RCD to the NS device, and the NS device will forward the subscription message to the subscription device, or the RCD sends the subscription message to the subscription device, such that after receiving the subscription message, the subscription device will send subsequent notification messages to the NS device such that the NS device can forward them to the RCD, ensuring that the RCD can receive messages in time without missing any message, thus greatly improving the success rate of message acquisition of the RCD.

In an implementation, before the RCD receives the notification message sent by the NS device corresponding to the sending address of the notification message, if the RCD sends a query message to the NS device, and the query message includes an identifier of the RCD, then the RCD receiving the notification message sent by the NS device corresponding to the sending address of the notification message includes: the RCD receives the notification message sent by the NS device according to the query message. In the above, the RCD sends a query message to the NS device, indicating that the RCD needs to query whether there is a needed notification message in the NS device, wherein the query message includes the identifier of the RCD, and then the NS device sends the notification message to the RCD after receiving the query message sent by the RCD, thus improving the flexibility of the timing when the RCD acquires the notification message, and greatly ensuring the success rate of message acquisition of the RCD.

In the above implementation, sending the query message to the NS device by the RCD includes: the RCD sends the query message to the NS device according to a preset period; or, the RCD queries a notification message list broadcast by the NS device, and sends the query message to the NS device if the notification message list indicates the notification message needed by the RCD. The notification message list includes an identification parameter used for the RCD to identify the notification message. Optionally, the identification parameter includes: a target resource identifier, a device identifier of RCD, or an identification code of subscription relation. In the above, the query message sent by the RCD may be sent by the RCD according to a preset period, wherein the preset period may be user-defined, which is not limited in this implementation. For example, the RCD sends a query message to the NS device every 10 minutes, or in a certain state, the RCD sends the query message to the NS device. In this way, in a normal working state, the RCD actively sends query messages to the NS device, thus ensuring that messages can be received in time without missing any message, which greatly improves the success rate of message acquisition of the RCD. In addition, the query message sent by the RCD may also be the notification message list which is broadcast by the NS device and queried by the RCD. If the notification message list indicates the notification message needed by RCD, the query message is sent to the NS device, wherein the notification message list includes an identification parameter for the RCD to identify the notification message, and the identification parameter may include: a target resource identifier, a device identifier of the RCD, or an identification code of subscription relation, etc. In the above, the NS device broadcasts the notification message list, which means that the NS device broadcasts all the notification messages such that all RCDs can see the messages in the list. When the RCD sees that the notification message list broadcast by the NS device includes the notification message needed by the RCD itself, the RCD sends to the NS device a query message containing an identifier of the notification message and the identifier of the RCD. In this way, after receiving the query message, the NS device sends a correct notification message to a correct RCD according to the resource identifier and the identifier of the RCD carried in the notification message, which greatly ensures the correctness of messages acquired by the RCD.

Before the RCD receives the notification message sent by the NS device, the RCD will first receive the notification message of subscription completion, to ensure that the RCD has the authority of subscribing to the target resource. In an implementation, the method further includes: the RCD receives a notification message of subscription completion, wherein the notification message of subscription completion is used for indicating that the RCD or the NS device corresponding to the RCD has the authority of subscribing to the target resource. In the above, the RCD receives the notification message of subscription completion, if the RCD sends the subscription message to the NS device, the RCD receives notification message of subscription completion sent by the NS device, and if the RCD sends the subscription message to the subscription device, the RCD receives the notification message of subscription completion sent by the subscription device. In this way, the RCD determines that the RCD or its corresponding NS device has the authority of subscribing to the target resource according to the received notification message of subscription completion, thereby further ensuring the success rate of message acquisition of the RCD.

Since the RCD may be in a state in which messages cannot be received normally, it is necessary to select an NS device to help the RCD to receive notification messages, that is, it is necessary to find a device with resources needed by the RCD to act as a proxy device. In an implementation, the implementation of the present disclosure provides a method for processing subscription message. This implementation relates to a specific process in which an RCD sends a resource creation request to an NS device and receives a first response message sent by the NS device, as shown in FIG. 10, the method further includes S901 and S902.

In S901, an RCD sends a resource creation request to an NS device, wherein the resource creation request is used for requesting to create a proxy resource on the NS device determined by the RCD.

In the above, the proxy resource created here represents a type of resource needed by the RCD. The resource creation request sent by the RCD is used for requesting to create the proxy resource on the NS devices determined by the RCD, that is, the NS device sent by the RCD is a proxy device selected by the RCD, and the RCD requests the proxy device (the NS device) to create the proxy resource.

In S902, the RCD receives a first response message sent by the NS device, wherein the first response message includes a sending address of the notification message.

Based on the above act S901, the RCD sends the resource creation request to the NS device, and the NS device will send a first response message to the RCD according to the type of the resource requested to be created. In the above, the first response message indicates that the NS device has successfully created the resource. In the above, the first response message includes the sending address of the notification message, such that the RCD can correctly receive subsequent notification messages according to the address.

According to the method for processing subscription message provided by this implementation, the RCD sends the resource creation request to the NS device and receives the first response message generated after the NS device receives the resource creation request successfully. In this way, after receiving the first response message, the RCD correctly receives the subsequent notification messages according to the address of the notification message carried in the first response message, which greatly ensures the accuracy of messages acquired by the RCD.

Figure 11A:
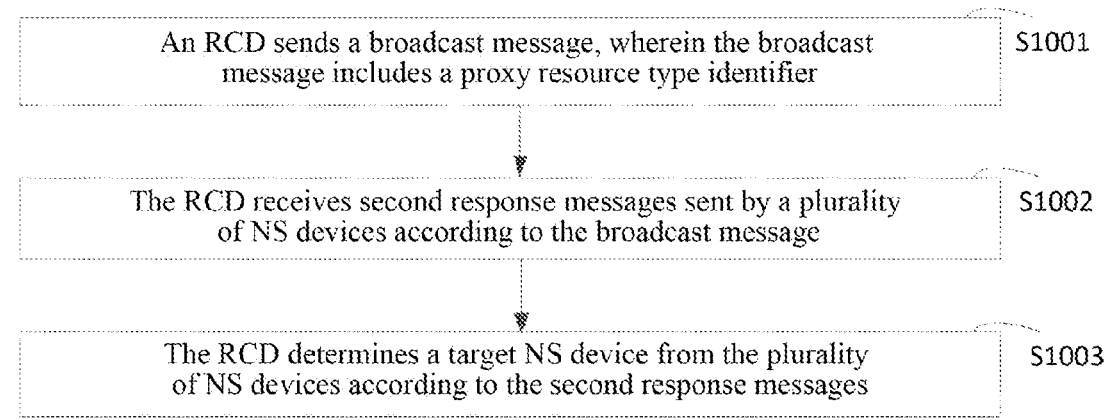
FIG. 11A is a schematic flowchart of a method for processing subscription message according to an implementation.

With regard to the process of selecting a proxy device by the RCD, an implementation of the present disclosure provides a method for processing subscription message, which relates to a specific process in which the RCD determines a target NS device, as shown in FIG. 11A, the method further includes: S1001, S1002, and S1003.

In S1001, an RCD sends a broadcast message, wherein the broadcast message includes a proxy resource type identifier.

Figure 11B:
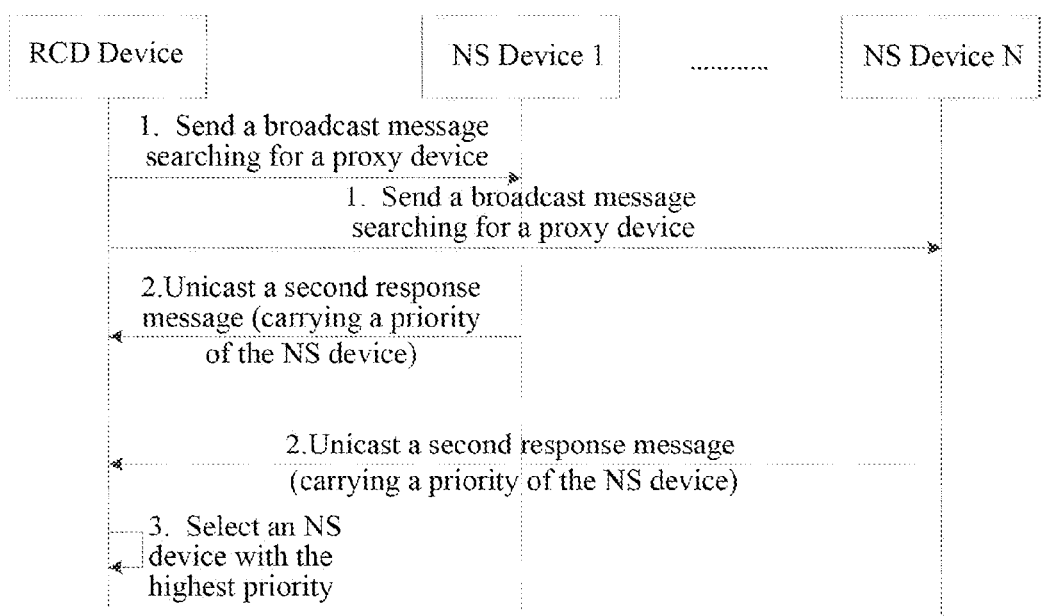
FIG. 11B is a schematic diagram of a method for determining a target NS device according to an implementation.

In this implementation, the proxy resource type identifier represents an identity of the type of the resource needed by the RCD, which may be a number, a letter or a combination of a number and a letter. As shown in FIG. 11B, the RCD sends a broadcast message, wherein the broadcast message indicates that the RCD needs to find an NS device having a resource needed by the RCD, and the broadcast message includes the proxy resource type identifier. In the above, the broadcast message may be received by multiple NS devices.

In S1002, the RCD receives second response messages sent by a plurality of NS devices according to the broadcast message.

In this act, as shown in the above FIG. 11B, a plurality of NS devices that have received the broadcast message sent by the RCD will send second response messages to the RCD, that is, the RCD receives the second response message sent by a plurality of NS devices according to the broadcast message. In the above, the second response message indicates that the NS devices all meet a condition of becoming a proxy device of the RCD. In the above, each NS device sends a second response message to the RCD by unicast.

In S1003, the RCD determines a target NS device from the plurality of NS devices according to the second response messages.

Based on the above act S1002, the RCD receives the second response messages sent by the plurality of NS devices, continuously referring to FIG. 11B, the RCD determines the target NS device from the plurality of NS devices. Optionally, an implementable mode for the RCD to determine the target NS device from the plurality of NS devices includes: the RCD determines an NS device with the highest priority as the target NS device according to the priority of the NS device carried in each second response message. In the above, the priority of each NS device indicates a preference degree of the NS device when it acts a target NS device, and the higher the priority, the more suitable it is to act as the target NS device. The second response message sent by each NS device carries its own priority, and the RCD determines the NS device with the highest priority as the target NS device according to the priority of the NS device carried in each second response message.

Figure 11C:
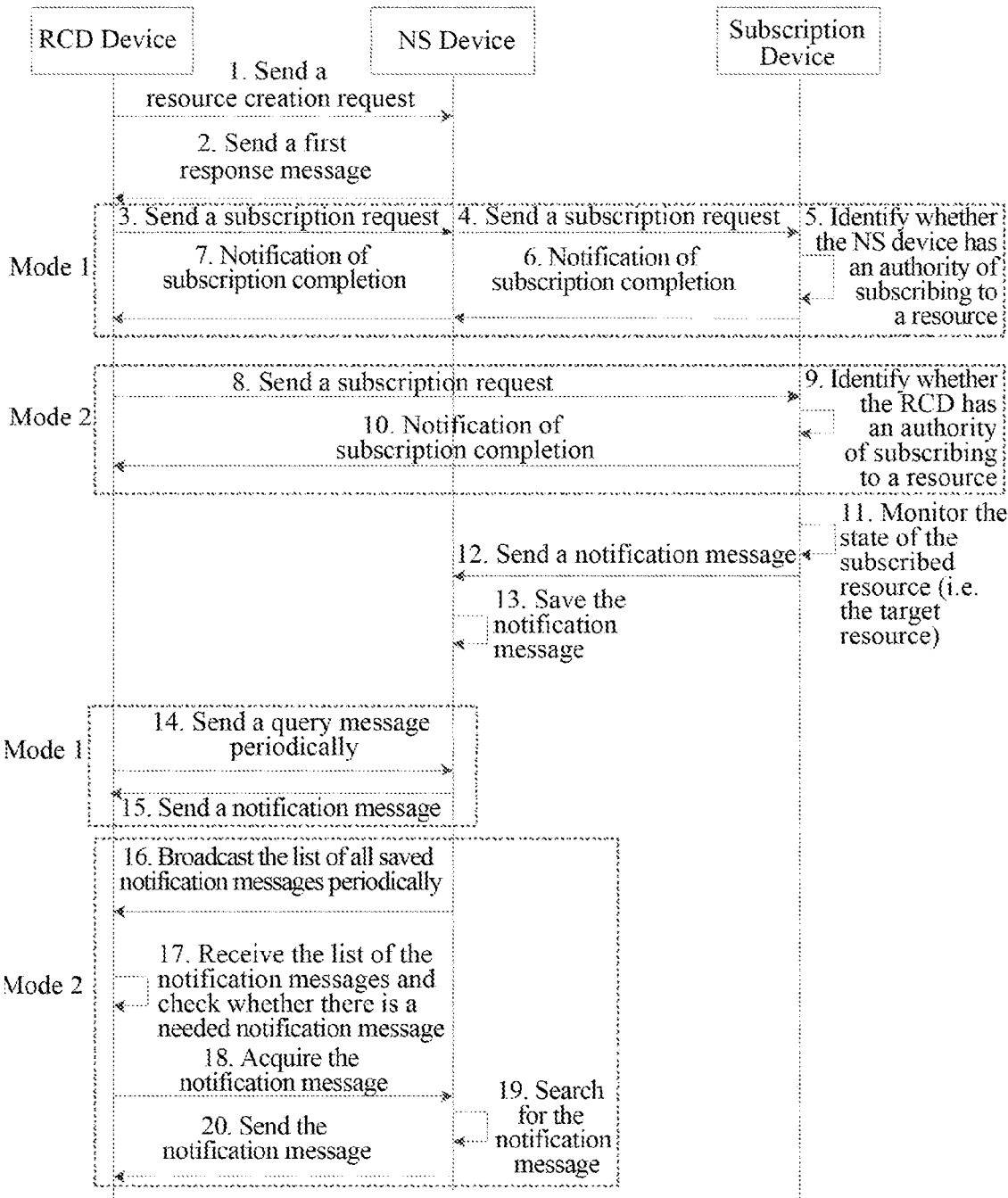
FIG. 11C is a schematic diagram of a whole process of a method for processing subscription message according to an implementation.

For example, as shown in FIG. 11C, according to a method for processing subscription message provided by an implementation of the present disclosure, an overall process may be as follows: an RCD sends a resource creation request to an NS device, and after receiving the resource creation request, the NS device sends a second response message to the RCD, and then the RCD sends a subscription request to the NS device (the NS device then sends the subscription request to the subscription device) or to the subscription device. After receiving the subscription request, the subscription device identifies whether the RCD or the NS device has the authority of subscribing to the resource. The subscription device monitors the state of the resource after confirming that the RCD or the NS device has the authority of subscribing to the resource, and sends a notification message to the NS device when the state of the resource changes. The NS device stores the notification message after receiving the notification message and sends the notification message to the RCD, wherein there are two modes, mode 1 and mode 2, for the NS device to send the notification message to the RCD. In Mode 1, the RCD periodically sends a notification message query to the NS device, and NS device receives the query message sent by RCD, finds the notification message and sends it to the RCD. In Mode 2, the NS device periodically broadcasts the list of all notification messages stored thereon. After receiving the broadcast message, the RCD checks whether there is the needed notification message on the notification message list. If there is the needed notification message, the RCD sends to the NS device a request for acquiring the notification message. After receiving the request, the NS device sends the corresponding notification message to the RCD.

According to the method for processing subscription message provided by this implementation, the RCD receives the second response message sent by each NS device according to the broadcast message, and determines the NS device with the highest priority as the target NS device according to the priority of each NS device carried in the second response message, such that the finally selected target NS device, due to its highest priority, is the best choice of the proxy device for the RCD, which greatly increases the success rate and accuracy of message acquisition of the RCD.

It should be understood that although the acts in the flowcharts of FIGS. 2-11 are shown in sequence as indicated by the arrows, these acts are not necessarily performed in the sequence as indicated by the arrows. Unless explicitly stated herein, the execution of these acts is not strictly limited in the sequence, and these acts may be executed in another sequence. Moreover, at least part of the acts in FIGS. 2-11 may include multiple sub-acts or multiple stages, which may not be necessarily completed at the same time, but may be performed at different times, and the sequence of execution of these sub-acts or stages may not be necessarily performed sequentially, but may be performed alternately with at least part of the sub-acts or stages of other acts, or other acts.

Figure 12:
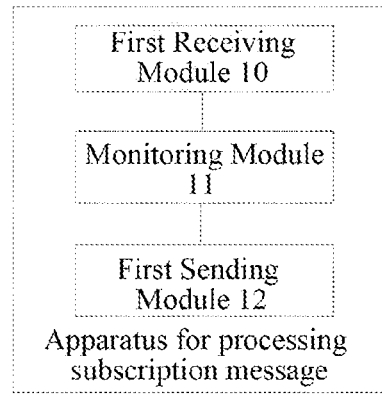
FIG. 12 is a structural block diagram of an apparatus for processing subscription message according to an implementation.

In an implementation, as shown in FIG. 12, there is provided an apparatus for processing subscription message, which includes a first receiving module 10, a monitoring module 11 and a first sending module 12.

The first receiving module 10 is configured to receive a subscription message wherein the subscription message includes a sending address of a notification message and a subscription resource identifier.

The monitoring module 11 is configured to monitor a target resource corresponding to the subscription resource identifier.

The first sending module 12 is configured to send a notification message to a notification server (NS) device, which is a notification proxy, according to the sending address of the notification message if the subscription device monitors a change in the target resource, such that the NS device forwards the notification message to a corresponding RCD.

The implementation principle and technical effect of the apparatus for processing subscription message provided by the above implementation are similar to those in the above method implementations, which will not be repeated here.

Figure 13:
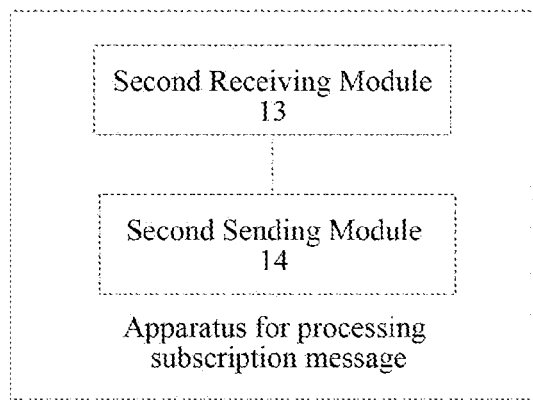
FIG. 13 is a structural block diagram of an apparatus for processing subscription message according to an implementation.

In an implementation, as shown in FIG. 13, there is provided an apparatus for processing subscription message, which includes a second receiving module 13 and a second sending module 14.

The second receiving module 13 is configured to receive a notification message sent by a subscription device, wherein the notification message is used for indicating a hange in a target resource subscribed by an RCD.

The second sending module 14 is configured to send the notification message to a corresponding RCD.

The implementation principle and technical effect of the apparatus for processing subscription message provided by the above implementation are similar to those in the above method implementations, which will not be repeated here.

Figure 14:
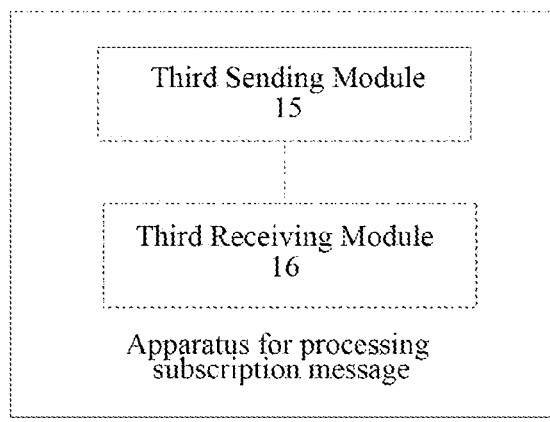
FIG. 14 is a structural block diagram of an apparatus for processing subscription message according to an implementation.

In an implementation, as shown in FIG. 14, there is provided an apparatus for processing subscription message, which includes a third sending module 15 and a third receiving module 16.

The third sending module 15 is configured to send a subscription message, wherein the subscription message includes a sending address of a notification message and a subscription resource identifier.

The third receiving module 16 is configured to receive a notification message sent by an NS device corresponding to the sending address of the notification message, wherein the notification message is used for indicating a change of a target resource corresponding to the subscription resource identifier.

The implementation principle and technical effect of the apparatus for processing subscription message provided by the above implementation are similar to those in the above method implementations, which will not be repeated here.

Specific limitations for the apparatus for processing subscription message may refer to the limitations for the method for processing subscription message described above, which will not be repeated here. Various modules in the above apparatus for processing subscription message may be implemented in whole or in part by software, hardware, and combinations thereof. The various modules may be embedded in, or independent of, the processor in the computer device in the form of hardware, or may be stored in a memory in the computer device in the form of software to facilitate the processor to call and execute the operations corresponding to the various modules.

Figure 15:
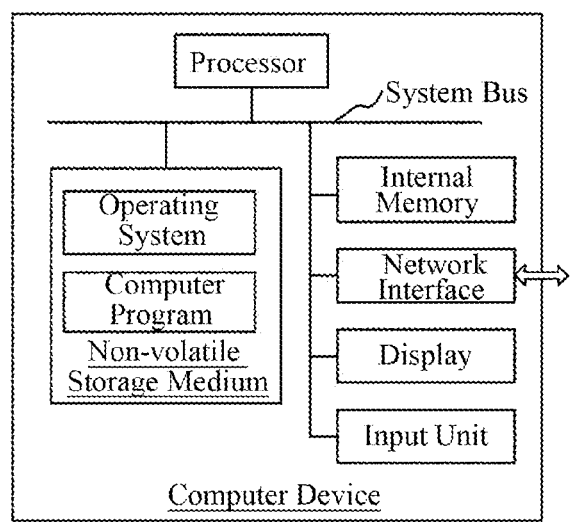
FIG. 15 is a block diagram of an internal structure of a computer according to an implementation.

In an implementation, a computer device is provided, the computer device may be a server, and its internal structure diagram may be as shown in FIG. 15. The computer device includes a processor, a memory, a network interface and a database which are connected via a system bus. In the above, the processor of the computer device is configured to provide computing and control capabilities. The memory of the computer device includes a non-volatile storage medium and an internal memory. An operating system, a computer program and a database may be stored in the non-volatile storage medium. The internal memory provides an environment for operation of the operating system and a computer program in the non-volatile storage medium. The database of the computer device is configured to store processing data of subscription messages. The network interface of the computer device is configured to communicate with external terminals through a network connection. The computer program, when executed by a processor, implements a method for processing subscription message.

Those skilled in the art will understand that the structure shown in FIG. 15 is only a block diagram of a part of a structure related to a solution of the present disclosure, but does not constitute restriction for the computer device to which the solution of the present disclosure is applied. A specific computer device may include more or fewer components than those shown in the figure, or combine some components, or have different component arrangements.

In an implementation, a computer device is provided, which includes a memory and a processor, wherein a computer program is stored in the memory, and when executing the computer program, the processor implements the following acts:

a subscription device receives a subscription message, wherein the subscription message includes a sending address of the notification message and a subscription resource identifier;

the subscription device monitors a target resource corresponding to the subscription resource identifier; and if the subscription device monitors a change of the target resource, the subscription device sends a notification message to a notification server (NS) device, which is a notification proxy, according to the sending address of the notification message, such that the NS device forwards the notification message to a corresponding RCD.

Or, an NS device receives a notification message sent by a subscription device, wherein the notification message is used for indicating a change of a target resource subscribed by an RCD; and the NS device sends the notification message to a corresponding RCD.

Or, an RCD sends a subscription message, wherein the subscription message includes a sending address of a notification message and a subscription resource identifier; and the RCD receives a notification message sent by an NS device corresponding to the sending address of the notification message, wherein the notification message is used for indicating a change in the target resource corresponding to the subscription resource identifier.

The implementation principle and technical effect of the computer device provided by the above implementation are similar to those in the above method implementations, which will not be repeated here.

An implementation provides a computer readable storage medium on which a computer program is stored, which is executable by a processor to implement the following acts:

a subscription device receives a subscription message, wherein the subscription message includes a sending address of the notification message and a subscription resource identifier;

the subscription device monitors a target resource corresponding to the subscription resource identifier; and if the subscription device monitors a change of the target resource, the subscription device sends a notification message to a notification server (NS) device, which is a notification proxy, according to the sending address of the notification message, such that the NS device forwards the notification message to a corresponding RCD.

Or, an NS device receives a notification message sent by a subscription device, wherein the notification message is used for indicating a change in a target resource subscribed by an RCD; and the NS device sends the notification message to a corresponding RCD.

Or, an RCD sends a subscription message, wherein the subscription message includes a sending address of a notification message and a subscription resource identifier; and the RCD receives a notification message sent by an NS device corresponding to the sending address of the notification message, wherein the notification message is used for indicating a change of the target resource corresponding to the subscription resource identifier.

The implementation principle and technical effect of the computer readable storage medium provided by the above implementation are similar to those of the above method implementation, and will not be described in detail here.

Those of ordinary skill in the art can understand that all or part of the processes of the methods in the above implementations can be completed by instructing related hardware through a computer program, the computer program may be stored in a non-volatile computer readable storage medium, and during the execution, the computer program can include the processes of the above method implementations. In the above, any reference to memory, storage, database or other media used in the implementations provided in the present disclosure can include non-volatile and/or volatile memories. The non-volatile memory may include a Read Only Memory (ROM), a Programmable ROM (PROM), an Electrically Programmable ROM (EPROM), an Electrically Erasable Programmable ROM (EEPROM), or a flash memory. The volatile memory may include random access memory (RAM) or an external cache memory. By way of illustration but not limitation, a RAM is available in various forms, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Memory Bus (Rambus) Direct RAM (RDRAM), a Direct Memory Bus Dynamic RAM (DRDRAM), and a Memory Bus Dynamic RAM (RDRAM).

The technical features of the above implementations may be combined with each other arbitrarily. In order to make the description concise, not all possible combinations of the technical features in the above implementations are described. However, as long as there is no conflict in the combinations of these technical features, they should be considered as falling in the scope recorded in this specification. The implementations described above only provide several implementation modes of the present disclosure, and their descriptions are relatively specific and detailed, but they are not to be construed as limiting the protection scope of the present disclosure. It should be noted that for those of ordinary skill in the art, variations and improvements may be made without departing from the concept of the present disclosure, which fall into the protection scope of the present disclosure. The protection scope of the present disclosure is subject to the appended claims.

What is claimed is:

1. A method for processing subscription message, comprising:
   receiving, by a subscription device, a subscription message sent from a notification server (NS) device, wherein the subscription message comprises a receiving address of notification message and a subscription resource identifier, the receiving address of notification message indicates an address of the NS device; wherein the subscription message is received by the NS device from a Resource Constrained Device (RCD), the RCD is configured to stay in a sleep state for a long time or periodically;
   monitoring, by the subscription device, a target resource corresponding to the subscription resource identifier; and
   sending, by the subscription device, a notification message to the NS device if the subscription device monitors a change of the target resource, wherein the notification message is used for indicating the change of the target resource subscribed by the RCD;
   wherein the NS device is a notification proxy for the RCD, wherein the NS device is configured to store the notification message sent from the subscription device and forward the notification message to the RCD when the RCD is in a working state.

2. The method of claim 1, wherein before monitoring, by the subscription device, the target resource corresponding to the subscription resource identifier, the method further comprises:
   identifying, by the subscription device, whether a sending end of the subscription message has an authority of subscribing to the target resource according to a device identifier carried in the subscription message; and
   storing, by the subscription device, the subscription message and sending a notification message of subscription completion to the sending end if the sending end has the authority of subscribing to the target resource.

3. The method of claim 1, wherein before monitoring, by the subscription device, the target resource corresponding to the subscription resource identifier, the method further comprises:
storing, by the subscription device, the subscription message and sending a notification message of subscription completion to a sending end of the subscription message if the sending end of the subscription message has an authority of subscribing to the target resource.

4. The method of claim 1, wherein after sending, by the subscription device, the notification message to the NS device, the method further comprises:
receiving, by the subscription device, a notification response message sent by the NS device.

5. A method for processing subscription message, comprising:
receiving, by a notification server (NS) device, a subscription message sent by a Resource Constrained Device (RCD); wherein the subscription message comprises a receiving address of notification message and a subscription resource identifier; wherein the RCD is configured to stay in a sleep state for a long time or periodically;
sending, by the NS device, the subscription message to a subscription device;
receiving, by the NS device, a notification message sent by the subscription device, wherein the notification message is used for indicating a change of a target resource subscribed by the RCD;
storing, by the NS device, the notification message sent by the subscription device; and
sending, by the NS device, the notification message to the RCD when the RCD is in a working state.

6. The method of claim 5, wherein after sending, by the NS device, the subscription message to the subscription device, the method further comprises:
receiving, by the NS device, a notification message of subscription completion sent by the subscription device, wherein the notification message of subscription completion is used for indicating that the NS device has an authority of subscribing to the target resource; and
forwarding, by the NS device, the notification message of subscription completion to the RCD.

7. The method of claim 5, wherein after receiving, by the NS device, the notification message sent by the subscription device, the method further comprises:
sending, by the NS device, a notification response message to the subscription device.

8. An apparatus for processing subscription message, comprising: a processor and a memory, wherein the memory is configured to store a computer program, and when the computer program is executed, the processor is configured to:
receive a subscription message sent by a Resource Constrained Device (RCD); wherein the subscription message comprises a receiving address of notification message and a subscription resource identifier, wherein the RCD is configured to stay in a sleep state for a long time or periodically;
send the subscription message to a subscription device;
receive a notification message sent by the subscription device, and store the notification message sent by the subscription device; wherein the notification message is used for indicating a change of a target resource subscribed by the RCD; and
send the notification message to the RCD when the RCD is in a working state.

9. The apparatus of claim 8, wherein the processor is configured to
receive a notification message of subscription completion sent by the subscription device after the processor sends the subscription message to the subscription device, wherein the notification message of subscription completion is used for indicating that the apparatus has an authority of subscribing to the target resource; and
forward the notification message of subscription completion to the RCD.

10. The apparatus of claim 8, wherein the processor is configured to
send a notification response message to the subscription device after the processor receives the notification message sent by the subscription device.

* * * * *